(12) United States Patent
Weyrauch et al.

(10) Patent No.: US 11,780,302 B2
(45) Date of Patent: Oct. 10, 2023

(54) SUN VISOR WITH AN INCORPORATED IMPACT POINT

(71) Applicant: Ford Global Technologies, LLC, Dearborn, MI (US)

(72) Inventors: Adam Weyrauch, Canton, MI (US); Rohit Telukunta, Novi, MI (US); Steven Frank, Dearborn, MI (US); Michael J. Gardynik, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 17/481,527

(22) Filed: Sep. 22, 2021

(65) Prior Publication Data
US 2023/0090047 A1      Mar. 23, 2023

(51) Int. Cl.
*B60J 3/02* (2006.01)
*A62B 3/00* (2006.01)

(52) U.S. Cl.
CPC ............. *B60J 3/0252* (2013.01); *A62B 3/005* (2013.01); *B60J 3/023* (2013.01); *B60J 3/0217* (2013.01)

(58) Field of Classification Search
CPC ........ B60J 3/0252; B60J 3/0217; B60J 3/023; B60J 3/0213; B60J 3/02; B60J 3/0234; B60J 3/0265; B60J 3/0239; B60J 1/2075; A62B 3/005
USPC .................................. 296/97.9, 97.11, 97.12
See application file for complete search history.

(56) References Cited

U.S. PATENT DOCUMENTS

| 4,178,035 | A | * | 12/1979 | Cziptschirsch | ........ | B60J 3/0252 |
| | | | | | | 296/97.13 |
| 4,569,552 | A | * | 2/1986 | Marks | .................... | B60J 3/0221 |
| | | | | | | 248/289.11 |
| 4,582,356 | A | * | 4/1986 | Kaiser | .................... | B60J 3/0239 |
| | | | | | | 296/97.11 |
| 5,013,953 | A | * | 5/1991 | Odell | ...................... | H02K 1/12 |
| | | | | | | 310/194 |
| 5,071,186 | A | * | 12/1991 | Hemmeke | .............. | B60J 3/0265 |
| | | | | | | 296/97.8 |
| 5,316,362 | A | * | 5/1994 | McGuinness | .......... | B60J 3/0213 |
| | | | | | | 296/97.9 |

(Continued)

FOREIGN PATENT DOCUMENTS

| CN | 112124052 A | | 12/2020 |
| KR | 101433038 B1 | * | 8/2014 |
| KR | 101891661 B1 | | 8/2018 |

*Primary Examiner* — Joseph D. Pape
*Assistant Examiner* — Veronica M Shull
(74) *Attorney, Agent, or Firm* — Vichit Chea; Price Heneveld LLP

(57) ABSTRACT

A sun visor assembly for a vehicle that includes a mount configured to be connected to the vehicle. A guide rod having a first portion that includes a head and a second portion with a terminal end is operably coupled to the mount via the head. An impact point is at the terminal end of the second portion. The guide rod and the impact point are configured for use as a window breaker tool in a disassembled position. A visor is operably coupled to the guide rod in an assembled position and is rotatable about the guide rod from a first position to a second position. The visor includes a channel defined within the visor that is configured to receive the guide rod.

20 Claims, 5 Drawing Sheets

(56) References Cited

U.S. PATENT DOCUMENTS

| | | | |
|---|---|---|---|
| 7,204,539 B2* | 4/2007 | Wieczorek | B60J 3/0239 |
| | | | 296/97.9 |
| 7,967,360 B2* | 6/2011 | Holden | B60J 3/0217 |
| | | | 296/97.13 |
| 8,015,643 B2 | 9/2011 | White | |
| 10,189,152 B2 | 1/2019 | Franken | |
| 10,668,847 B2 | 6/2020 | Takenaka et al. | |
| 2014/0091592 A1* | 4/2014 | Dolisy | B60J 3/0265 |
| | | | 296/97.9 |
| 2019/0061413 A1* | 2/2019 | Yang | B43K 7/005 |
| 2020/0373957 A1 | 11/2020 | Sharinn et al. | |

* cited by examiner

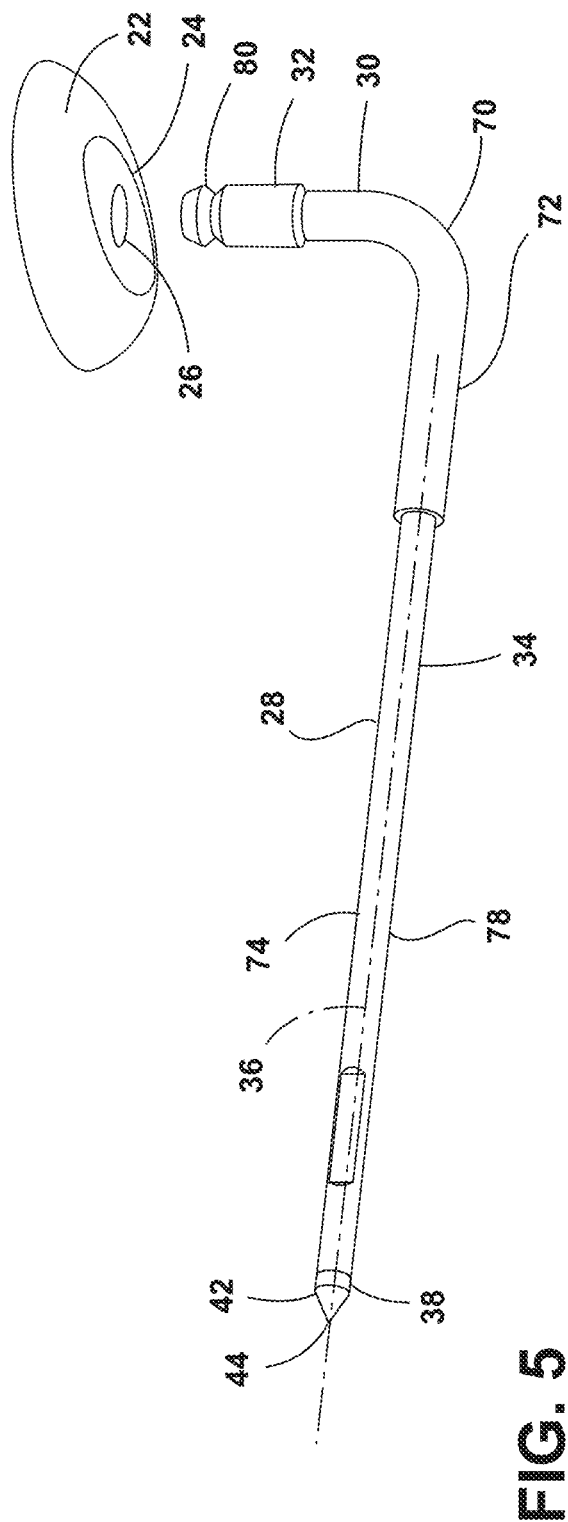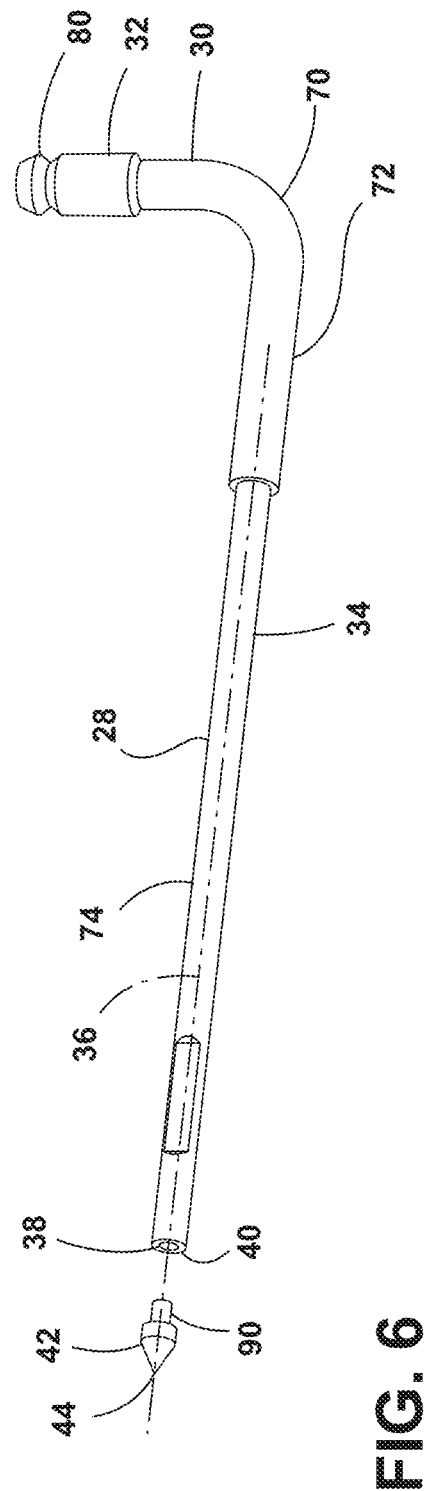
FIG. 5
FIG. 6

SUN VISOR WITH AN INCORPORATED IMPACT POINT

FIELD OF THE DISCLOSURE

The present disclosure generally relates to a sun visor assembly, in particular, a sun visor assembly with a window breaker tool.

BACKGROUND OF THE DISCLOSURE

Sun visors are commonly employed on motor vehicles. Sun visors are typically located in a passenger compartment and near a window of the vehicle. Further, window breaker tools are also commonly available in motor vehicles and are often kept in various locations proximate to the window of the vehicle. It would be desirable to provide for an arrangement of vehicle devices that makes more efficient use of the consumed space.

SUMMARY OF THE DISCLOSURE

According to a first aspect of the present disclosure, the present invention relates to a sun visor assembly for a vehicle that includes a mount, a guide rod, an impact point, and a visor with a channel. The mount is configured to be connected to the vehicle. The guide rod has a first portion and a second portion, wherein the first portion includes a head operably coupled to the mount and the second portion includes a terminal end. The impact point is at the terminal end of the second portion. The guide rod and the impact point are configured for use as a window breaker tool in a disassembled position. The visor is coupled to the guide rod in an assembled position and is rotatable about the guide rod from a first position to a second position. The channel defined within the visor is configured to receive the guide rod.

Embodiments of the first aspect of the disclosure can include any one or a combination of the following features:
- the visor is operably coupled to the second portion of the guide rod;
- the head operably decouples from the mount when a vehicle-downward force is applied to the guide rod, wherein the second portion is configured to decouple from the visor when a lateral force that is opposite the terminal end is applied to the guide rod;
- the guide rod is in the assembled position when the head is operably coupled to the mount, a retaining feature is operably coupled to an interior ceiling of the vehicle, and the second portion is couple to the visor, and wherein the guide rod is in the disassembled position when the head is decoupled from the mount, the retaining feature is decoupled from the interior ceiling of the vehicle, and the second portion is decoupled from the visor;
- the second portion includes a center axis, wherein the impact point is coaxial with the center axis;
- the second portion includes an impact member that is coaxial with the center axis, wherein the terminal end defines a receiver, and wherein the impact member is coupled to the receiver;
- the impact member is press-fit coupled to the receiver;
- the impact member defines a conical shape; and
- the guide rod first portion and second portion intersect at a corner, wherein the guide rod first portion, second portion, and the corner generally define an L-shape.

According to a second aspect of the present disclosure, the present invention relates to a sun visor assembly for a vehicle that includes a mount, a guide rod, an impact member, and a visor with a channel and a retaining feature. The mount has a vehicle-downward section and an aperture defined on the vehicle-downward section. The guide rod has a first portion and a second portion, wherein the first portion includes a head operably coupled to the mount and the second portion includes a center axis and a terminal end that defines a receiver. The impact member is coupled to the receiver and is coaxial with the center axis of the second portion, wherein the impact member includes an impact point that is laterally displaced from the terminal end and is coaxial with the center axis of the second portion. The visor is coupled to the second portion and is rotatable about the second portion from a first position to a second position. The channel defined within the visor is configured to receive the guide rod. The retaining feature is defined on the visor and is operably coupled to an interior ceiling of the vehicle. The retaining feature is configured to limit a vertical movement and a lateral movement of the visor.

Embodiments of the second aspect of the disclosure can include any one or a combination of the following features:
- the head operably decouples from the mount and the retaining feature operably decouples from the interior ceiling of the vehicle when a vehicle-downward force is applied to the guide rod, wherein the second portion is configured to decouple from the visor when a lateral force that is opposite the terminal end is applied to the guide rod;
- the guide rod is in an assembled position when the head is operably coupled to the mount, the retaining feature is operably coupled to the interior ceiling of the vehicle, and the second portion is coupled to the visor, wherein the guide rod is in a disassembled position when the head is decoupled from the mount, the retaining feature is decoupled from the interior ceiling of the vehicle, and the second portion is decoupled from the visor;
- the impact member defines a conical shape;
- the guide rod first portion and second portion intersect at a corner, wherein the guide rod first portion, second portion, and the corner generally define an L-shape;
- the impact member is integrally coupled to the receiver; and
- the impact member is press-fit coupled to the receiver.

According to a third aspect of the present disclosure, the present invention relates to a method of operating a sun visor assembly for a vehicle, the method comprising: positioning a visor on a supporting guide rod; decoupling the visor and the guide rod from a mount coupled to an interior ceiling of the vehicle; translating the guide from out from a channel defined within a top section of the visor; and forcibly moving the guide rod toward a window of the vehicle such that an impact point at a terminal end of the guide rod contacts the window.

Embodiments of the third aspect of the disclosure can include any one or a combination of the following features:
- breaking the window of the vehicle with the contact;
- rotating the visor about a center axis of a second portion of the guide rod from a first position to a second position; and
- decoupling the visor and the guide rod from a retaining feature coupled to the interior support of the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a perspective view of a guide rod, an impact member, and a mount of the sun visor assembly in the disassembled position, according to one example; and FIG. 6 is an exploded view of a guide rod, an impact member, and a mount of the sun visor assembly, according to one example.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
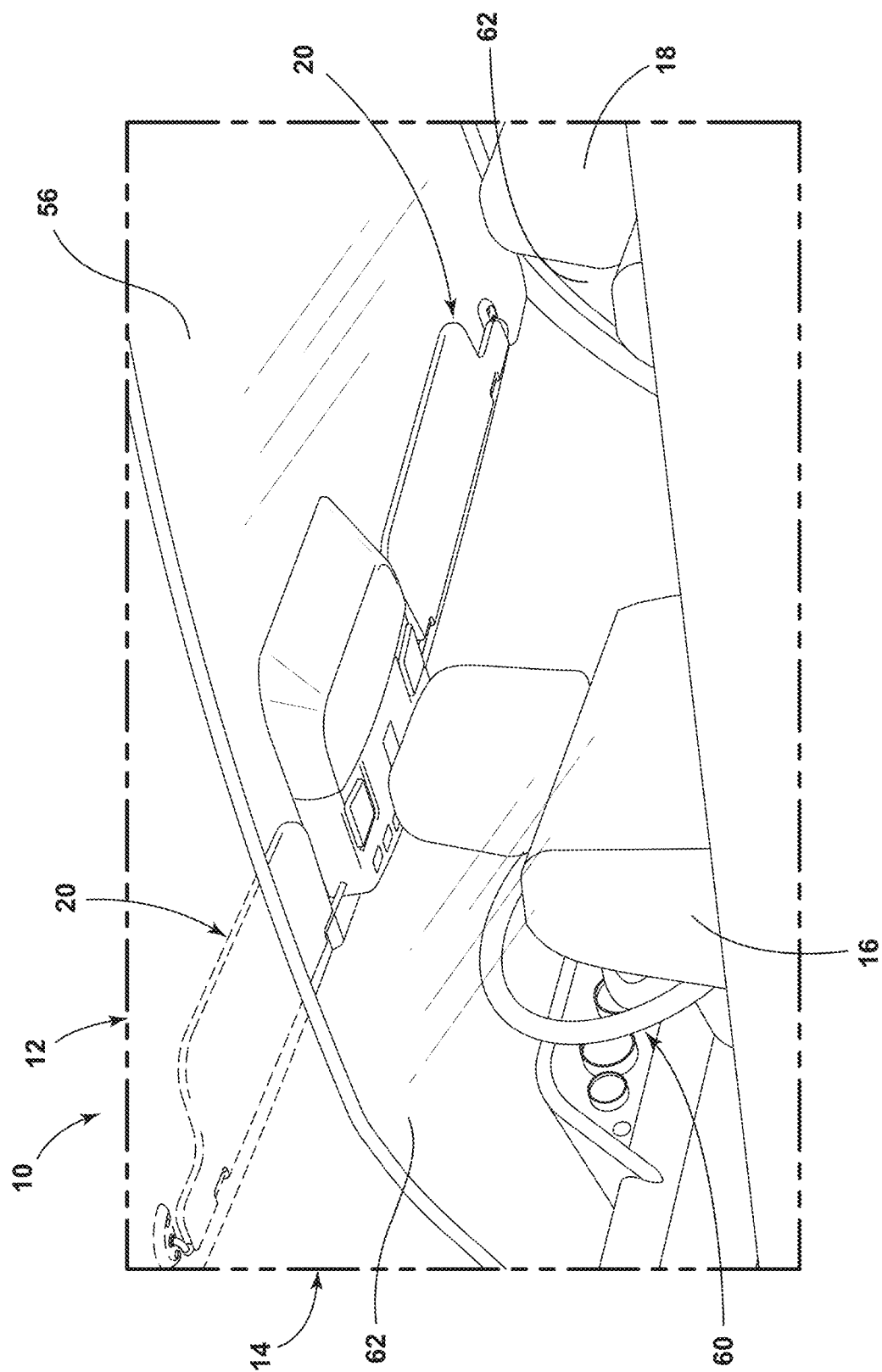
FIG. 1 is a perspective view of an upper forward portion of a vehicle passenger compartment having a sun visor assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a sun visor assembly and a window breaker tool. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a vehicle 10 has a vehicle interior 12 that includes a passenger compartment 14 therein contained within the vehicle interior 12. The passenger compartment 14 may include one or more seats, such as a driver seat 16 and a passenger seat 18, that are proximate one at least one sun visor assembly 20. The sun visor assembly 20 includes a mount 22 having a vehicle-downward section 24 and an aperture 26 define on the vehicle-downward section 24. A guide rod 28 having a first portion 30 that includes a head 32 and a second portion 34 with a center axis 36 and a terminal end 38 that defines a receiver 40 is operably coupled to the mount 22 via the head 32. An impact member 42 is operably coupled to the receiver 40 and is coaxial with the center axis 36 of the second portion 34. The impact member 42 includes an impact point 44 that is laterally displaced from the terminal end 38 and is coaxial with the center axis 36 of the second portion 34. A visor 46 is operably coupled to the second portion 34 and is rotatable about the second portion 34 from a first position 48 to a second position 50. The visor 46 includes a channel 52 defined within the visor 46 and configured to receive the guide rod 28. The visor 46 defines a retaining feature 54 that is operably coupled to an interior ceiling 56 of the vehicle 10 and is configured to limit a vertical movement and a lateral movement of the visor 46.

In FIG. 1, the vehicle interior 12 includes a passenger compartment 14. The passenger compartment 14 may include a first seating row 60. Fewer or more seating rows may be included in the passenger compartment 14 without departing from the teachings herein. The first seating row 60 may include the driver seat 16 and the passenger seat 18. It is contemplated that a second seating row may include rear passenger seats. The rear passenger seats of the second seating row may include bucket seating or may be bench seating. The passenger compartment 14 may also include the interior ceiling 56 that extends along the periphery of the vehicle interior 12 and is above the first seating row 60 and the second seating row, and a window 62 and/or a plurality of windows 62 proximate the interior ceiling 56. The sun visor assembly 20, as illustrated in FIG. 1, may be disposed and coupled to the interior ceiling 56 of the vehicle interior 12 and may be proximate the window 62 of the vehicle 10.

While the passenger compartment 14, as illustrated in FIG. 1, has the sun visor assembly 20 disposed on the interior ceiling 56 of the vehicle interior 12, it is contemplated that the sun visor assembly 20 may be positioned in various practicable locations within the passenger compartment 14 of the vehicle interior 12 without departing from the teachings herein. By way of example, and not limitation, the sun visor assembly 20 may be disposed and coupled to a door of the vehicle 10, a column of the vehicle 10, and/or another interior support of the vehicle.

In various examples, the passenger compartment 14 is a passenger compartment that may be within the vehicle interior 12 of a sedan, a sport utility vehicle (SUV), a truck, a van, a crossover vehicle, and/or other styles of vehicles 10. The passenger compartment 14 may be within the vehicle interior 12 of a manually operated vehicle 10 (e.g., with a human driver), a fully autonomous vehicle 10 (e.g., no human driver), or a partially autonomous vehicle 10 (e.g., may be operated with or without a human driver).

Figure 2:
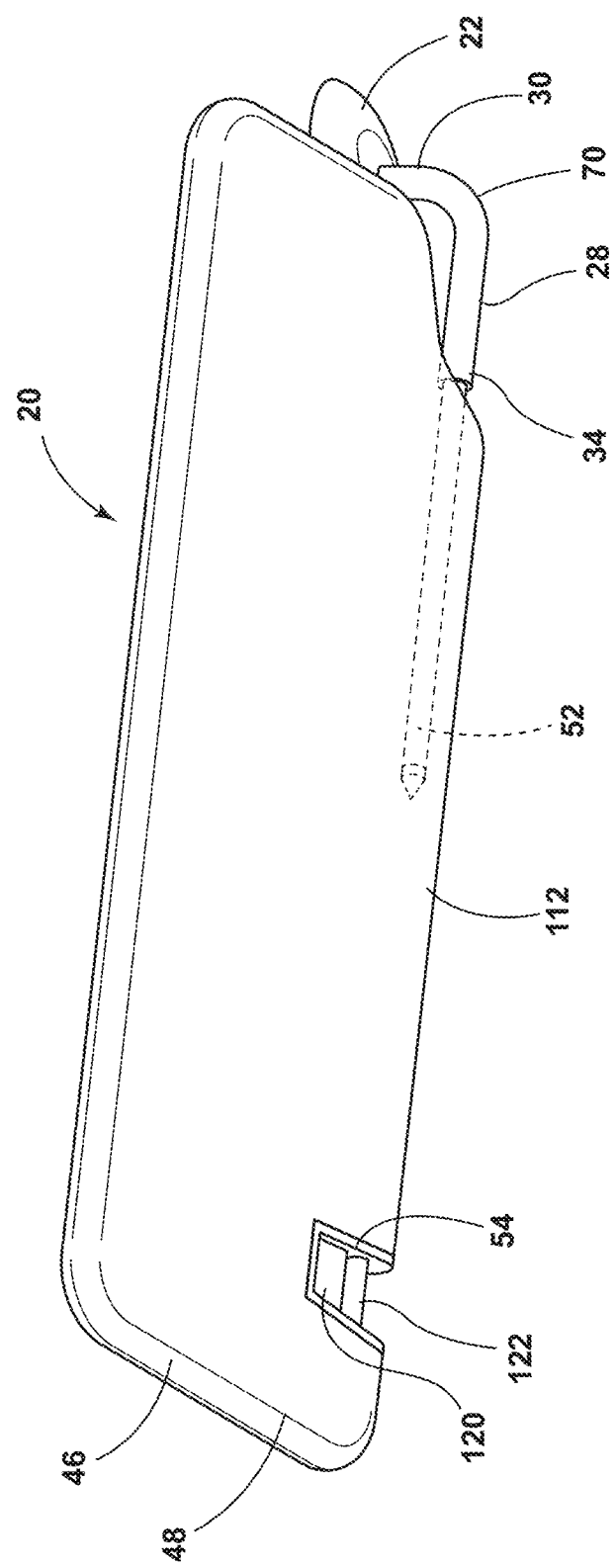
FIG. 2 is a perspective view of a sun visor assembly having a visor in a first position, according to one example.
Figure 3:
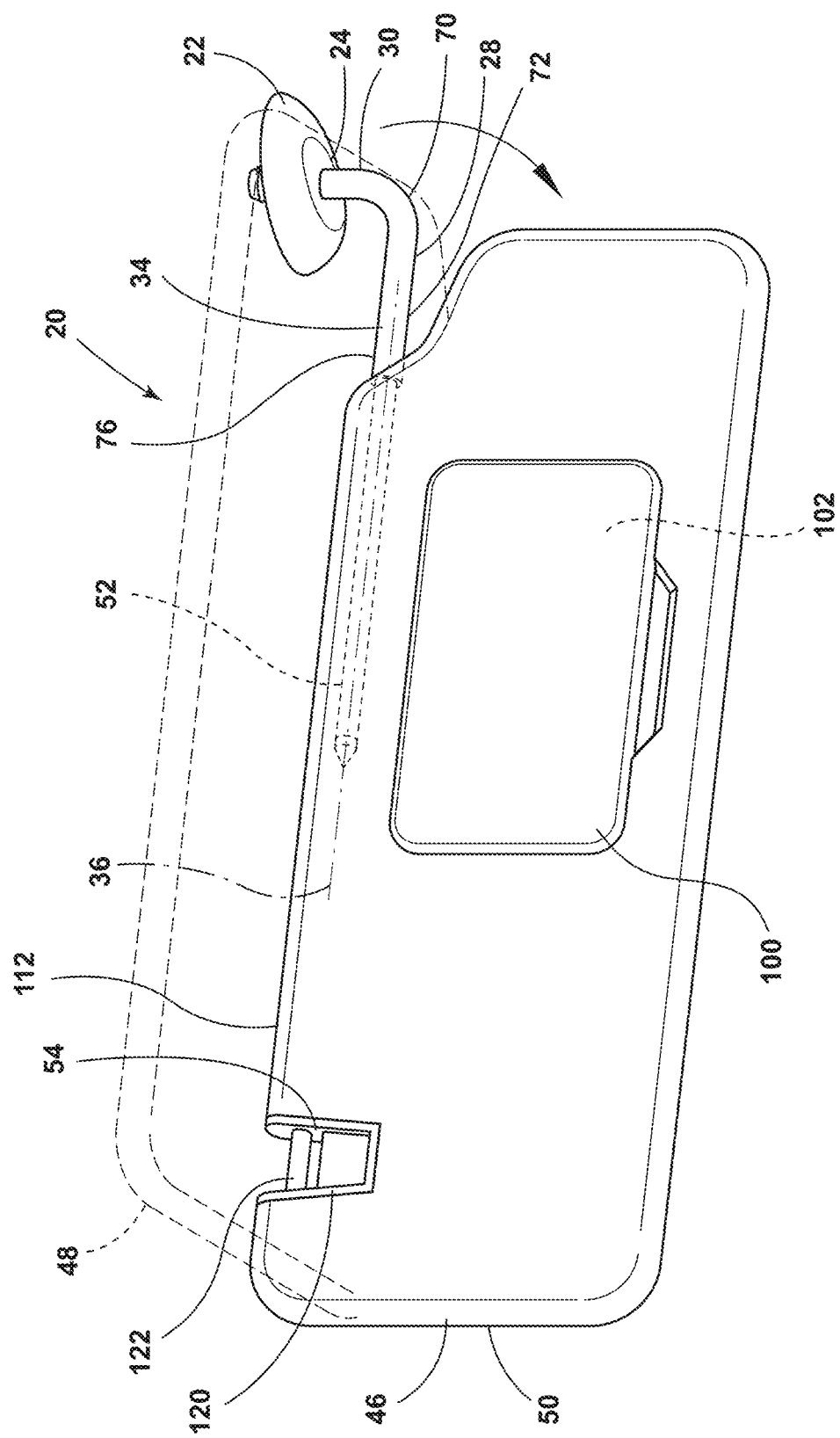
FIG. 3 is a perspective view of the sun visor assembly having the visor in a second position, according to one example.

Referring to FIGS. 2, 3 and 5, the sun visor assembly 20 may include a mount 22. The mount 22 may be coupled to an interior support such as the interior ceiling 56 of the vehicle interior 12 via at least one connector, such as one or more fasteners. In some embodiments, the mount 22 includes a vehicle-downward section 24 that defines an aperture 26. In yet other configurations, the mount 22 may include a latch, or other coupler configured to removably couple to the guide rod 28. In practice, the mount 22 is configured to operably couple to the guide rod 28 and support additional components of the sun visor assembly 20. For example, the mount 22 may be configured to operably couple to the guide rod 28 via the aperture 26 or another operable coupler and support at least part of the sun visor assembly 20.

In the embodiment shown, the sun visor assembly 20 includes the guide rod 28 operably coupled to the mount 22. The guide rod 28 may further include a first portion 30 and a second portion 34, wherein the first portion 30 and the second portion 34 intersect at a corner 70 of the guide rod 28, and wherein the first portion 30, second portion 34, and the guide rod corner 70 generally define an L-shape. In the illustrated embodiment, the guide rod 28 may further comprise a sleeve 72 and a shaft 74 coupled to and extending outward from the sleeve 72, wherein the sleeve 72 includes the first portion 30, the corner 70, and at least a part of the second portion 34, and the shaft 74 includes at least a part of the second portion 34.

Figure 4:
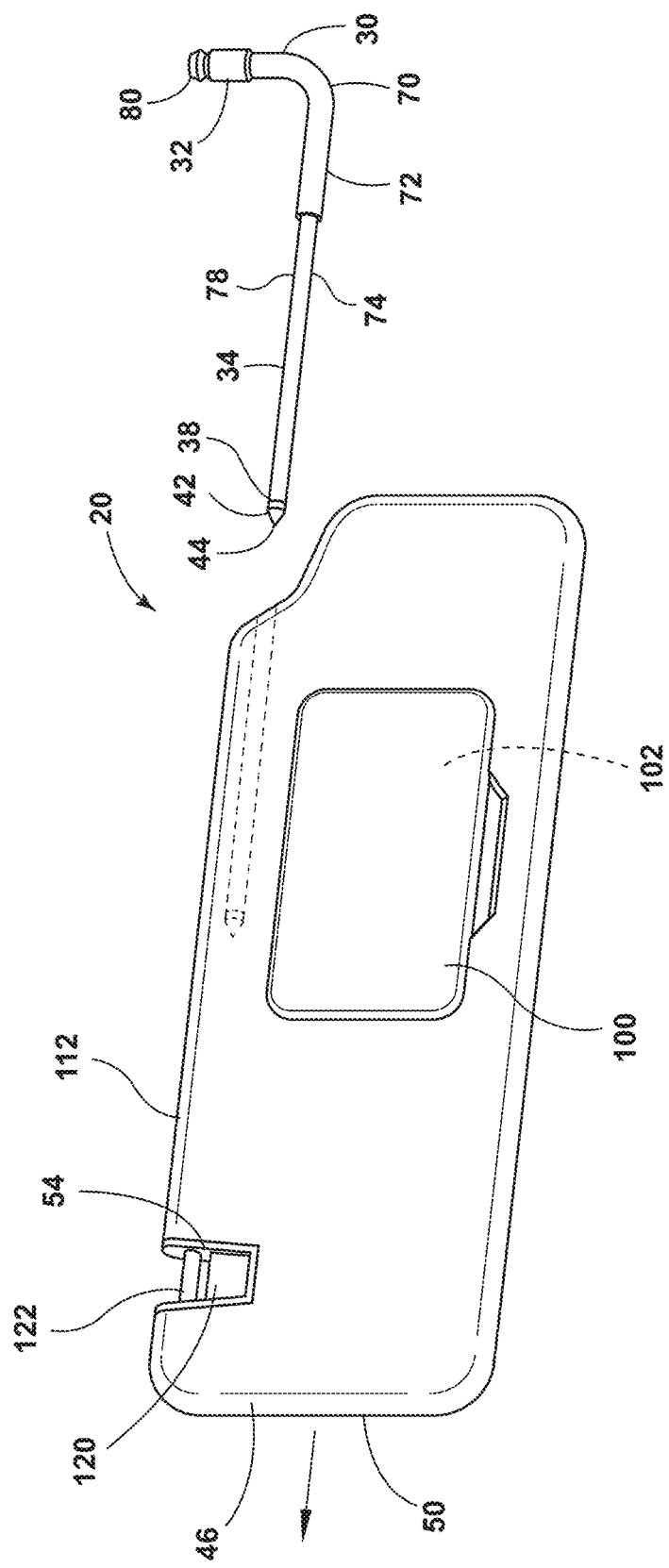
FIG. 4 is a perspective view of the sun visor assembly in a disassembled position, according to one example.

As illustrated in FIGS. 3 and 4, the guide rod 28 is operable between an assembled position 76 and disassembled position 78. In the assembled position 76, the guide rod 28 may be operably coupled to the visor 46 via the channel 52 such that the rotational movement of the visor 46 is permitted when a vehicle-rearward, a vehicle-forward, a vehicle-upward, and/or a vehicle-downward force is applied to the visor 46. In the disassembled position 78, the guide rod 28 is decoupled from the mount 22 and the visor 46 and is used as a window breaker tool. The guide rod 28, when used as a window breaker tool in the disassembled position 78, may be grasped by the user and directed towards the window 62 of the vehicle 10, wherein an impact member 42 may contact the window 62 of the vehicle to break the window 62, as further discussed.

Referring to FIGS. 4-6, the first portion 30 of the guide rod 28 includes a head 32. In the embodiment shown, the head 32 may include a front section 80 with at least one chamfer. The head 32 may be integrally formed out of the first portion 30 of the guide rod 28. For example, the head 32 may be integrally formed out of the sleeve 72, as illustrated in FIGS. 5 and 6. In other configurations, the head 32 may be coupled to the guide rod 28. The head 32 is configured to be operably positioned and retained within the aperture 26 defined on the vehicle-downward section 24 of the mount 22 such that the guide rod 28 and additional components of the sun visor assembly 20 are operably coupled to the mount 22. It is generally contemplated that the head 32 may be operably coupled and retained within the aperture 26 through a press-fit, a coupler, a magnet, or other coupling, so long as the head 32 may be coupled and retained within the aperture 26 defined on the vehicle-downward section 24 of the mount 22. The head 32 is also configured to decouple from the mount 22 when a vehicle-downward directed force is applied to the guide rod 28. For example, the user desiring to decouple the head 32 from the mount 22, may grasp the guide rod 28 and apply a pulling force directed vehicle-downward such that the head 32 releases and decouples from the mount 22.

Referring to FIGS. 4-6, the guide rod 28 may include the impact member 42 at a terminal end 38. In the illustrated embodiment, the impact member 42 includes an impact point 44 laterally distal and coaxial with the impact member 42. As illustrated in FIGS. 5 and 6, the impact member 42 may be coaxial with a center axis 36 of the second portion 34 and may be coupled to the terminal end 38 of the guide rod second portion 34. For example, the impact member 42 may have a generally conical shape, as illustrated in FIG. 6, that is coaxial the center axis 36 of the second portion 34. It is generally contemplated that the impact member 42 may define any number of shapes, such as a generally square pyramid shape, hexagonal pyramid shape, or any number of shape, so long as the impact member 42 is coaxial with the center axis 36 of the second portion 34, in one example. In the embodiment shown, a rear section 90 of the impact member 42 may be inserted into a receiver 40 defined on the terminal end 38 of the second portion 34 such that the impact member 42 is coupled to the second portion 34 of the guide rod 28. In this embodiment, the impact member 42 may be comprised of hardened steel, carbide, or a material (e.g., metal, composite, hardened plastic) of like hardness sufficient to break a window with force and may be press-fit into the receiver 40 on the terminal end 38 of the guide rod second portion 34. In yet other configurations, the impact point 44 may be integrally formed out of the second portion 34 of the guide rod 28, such that the impact point 44 was cast and/or machined out of the guide rod 28. By way of example, not limitation, the shaft 74 may be comprised of a hardened steel and the impact point 44 may be machined into the terminal end 38 of the second portion 34 that is located on the shaft 74.

Referring further to FIGS. 4-6, the impact member 42 is configured to contact the window 62 with a force applied by a user (e.g., a passenger) and translate a force acting on the guide rod 28 to the window 62 when the guide rod 28 is in the disassembled position 78. The impact member 42, upon contacting the window 62, also focuses the force acting on the guide rod 28 through the reduced contact area of the impact point 44. The focusing of the force via the impact point 44 creates a focused force sufficient to break the window 62. For example, the user may grasp the guide rod 28 in the disassembled position 78 and forcefully move the guide rod 28 towards the window 62 and contact the window with the impact point 44 of the impact member 42. Upon contact, the force generated by movement of the guide rod 28 is translated and focused by the impact point 44 as it contacts and breaks the window 62.

The sun visor assembly 20 includes the visor 46. In some configurations, the visor 46 includes a panel 100 rotatably coupled to the visor 46 and configured to cover user interactive components 102, such as a mirror and at least one lighting element. In the illustrated embodiment, the visor 46 is coupled to the guide rod 28. In some configurations, the visor 46 may be operably coupled to the second portion 34 of the guide rod 28. In this configuration, the visor 46 is rotatable about the center axis 36 of the second portion 34 from a first position 48 where the panel 100 is proximate the interior ceiling 56 of the vehicle 10, to a second position 50 wherein the panel 100 is faced vehicle-rearward, when a vehicle-rearward force or a vehicle-forward force is applied to the visor 46. In the second position 50, the visor 46 is configured to reduce light emitting on the user's face and allow the user to interact with the user interactive components 102.

As illustrated in FIGS. 3 and 4, a visor top section 112 may define the channel 52. In the illustrated embodiment, the channel 52 is integrally formed out of the visor 46 and extends along a width of the visor. In other embodiments, the channel 52 may be proximate the visor top section 112. For example, the visor top section 112 may include a plurality of brackets that define the channel 52. The channel 52 is configured to receive the guide rod 28 such that the guide rod 28 is housed within the channel 52 when in the assembled position 76 and the center axis 36 of the second portion 34 is generally coaxial with the channel 52 when the guide rod 28 is in the assembled position 76.

Referring further to FIGS. 2-4, the visor top section 112 may define a retaining feature 54. The retaining feature 54 may generally define a notch 120 and a retaining element 122. The retaining element 122 may comprise a cylindrical member, as illustrated. The retaining feature 54 may operably couple to an interior support such as the interior ceiling 56 of the vehicle 10 via a retainer. The retaining feature 54 is configured to limit a vertical movement, lateral movement of the visor 46, and a rotational movement about the first portion 30 of the guide rod 28 when the retaining feature 54 is operably coupled to the interior ceiling 56 of the vehicle 10. The retaining feature 54 is also configured to operably decouple from the retainer when a vehicle-downward force is applied to the guide rod 28 and/or the visor 46. For example, the user wishing to decouple the retaining feature 54 from the interior ceiling 56, may grasp the guide rod 28 and/or the visor 46 and apply a vehicle-downward pulling force to decouple the retaining feature 54 from the interior ceiling 56.

In operation of an exemplary embodiment of the sun visor assembly 20, the sun visor assembly 20 may initially be in a non-use condition in which the sun visor assembly 20 is not used to shield light or break a window. In the non-use condition, the guide rod 28 will be in the assembled position 76, such that the guide rod 28 will be coupled to the mount 22 via the head 32 inserted into the aperture 26 and will be coupled to the visor 46 through retainment of the second portion 34 in the channel 52. Further, in the non-use condition, the visor 46 will be in the first position 48 and the panel 100 will generally face towards the interior ceiling 56 of the vehicle 10.

A user desiring to use the sun visor assembly 20 to shield light, may grasp the visor 46, apply a rotational force, and move the visor 46 from the first position 48 to the second position 50. As the visor 46 moves from the first position 48 to the second position 50, the visor 46 rotates about the center axis 36 of the guide rod second portion 34 as the guide rod 28 is housed within the channel 52.

Once the visor 46 is in the second position 50, the user, desiring to use the impact member 42 as a window breaker tool, may grasp the visor 46 and pull in a vehicle-downward direction. The pulling force will then decouple the retaining feature 54 from the interior ceiling 56 of the vehicle 10 and decouple the head 32 from the mount 22. Next, the user may grasp the first portion 30 of the guide rod 28 and laterally translate the guide rod 28 out of the channel 52. Once the guide rod 28 is translated out of the channel 52, the guide rod 28 is in the disassembled position 78 and the user may forcibly move the impact member 42 towards the window 62. The impact point 44 of the impact member 42 will then contact the window 62, focus a force generated by the movement of the guide rod 28, translate the force to the window 62, and break the window 62 with sufficient force.

Use of the presently disclosed device may provide for a variety of advantages. First the impact member 42 being coupled to the guide rod 28 of the sun visor assembly 20 integrates the window breaker tool in the sun visor assembly 20 and reduces the footprint within the vehicle interior 12, as compared to a vehicle 10 with a window breaker tool that is a separate assembly from the sun visor. Second, the impact member 42 being coupled to the guide rod 28 of the sun visor assembly 20 reduces the number of components, which may improve manufacturing efficiencies of the vehicle 10. Third, the impact member 42 being coupled to the guide rod 28 of the sun visor assembly 20 increases user satisfaction as the impact member 42 is in a consistent location and is proximate the window 62, as compared to a vehicle with a window breaker tool that is a separate assembly from the sun visor.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sun visor assembly for a vehicle, comprising:
a mount configured to be connected to the vehicle;

a guide rod having a first portion and a second portion, wherein the first portion includes a head operably coupled to the mount, and wherein the second portion includes a terminal end;

an impact point at the terminal end of the second portion, the impact point being comprised of a hardened material, wherein the impact point is configured for use as a window breaker tool in a disassembled position; and a visor operably coupled to the guide rod in an assembled position and rotatable about the guide rod from a first position to a second position, the visor comprising a channel defined within the visor, wherein the channel is configured to receive the guide rod.

2. The sun visor assembly of claim 1, wherein the visor is operably coupled to the second portion of the guide rod.

3. The sun visor assembly of claim 2, wherein the head operably decouples from the mount when a vehicle-downward force is applied to the guide rod, and wherein the second portion is configured to decouple from the visor when a lateral force that is opposite the terminal end is applied to the guide rod.

4. The sun visor assembly of claim 3, wherein the guide rod is in the assembled position when the head is operably coupled to the mount, a retaining feature is operably coupled to an interior ceiling of the vehicle, and the second portion is coupled to the visor, and wherein the guide rod is in the disassembled position when the head is decoupled from the mount, the retaining feature is decoupled from the interior ceiling of the vehicle, and the second portion is decoupled from the visor.

5. The sun visor assembly of claim 1, wherein the second portion includes a center axis, and wherein the impact point is coaxial with the center axis.

6. The sun visor assembly of claim 5, wherein the second portion includes an impact member that is coaxial with the center axis, and wherein the terminal end defines a receiver, and wherein the impact member is coupled to the receiver.

7. The sun visor assembly of claim 6, wherein the impact member is press-fit coupled to the receiver, and wherein the impact member includes an impact point distal from the terminal end and extending away from the terminal end, and wherein the impact member includes a rear section that extends away from the terminal end and into the receive and a rear surface that abuts the terminal end.

8. The sun visor assembly of claim 6, wherein the second portion is configured to decouple from the visor when a lateral force that is opposite the terminal end is applied to the guide rod.

9. The sun visor assembly of claim 1, wherein the guide rod first portion and second portion intersect at a corner, and wherein the guide rod first portion, second portion, and the corner generally define an L-shape.

10. A sun visor assembly for a vehicle, comprising:
a mount having a vehicle-downward section and an aperture defined on the vehicle-downward section;
a guide rod having a first portion and a second portion, wherein the first portion includes a head operably coupled to the mount, and wherein the second portion includes a center axis and a terminal end that defines a receiver;
an impact member coupled to the receiver, wherein the impact member is coaxial with the center axis of the second portion, and wherein the impact member includes an impact point that is laterally displaced from the terminal end and is coaxial with the center axis of the second portion, and wherein the impact member includes a hardened material with a hardness sufficient to break a window with force; and
a visor operably coupled to the second portion and rotatable about the second portion from a first position to a second position, the visor comprising:
a channel defined within a top section of the visor and extending along a width of the visor, wherein the channel is configured to receive the guide rod; and
a retaining feature defined on the visor and operably coupled to an interior ceiling of the vehicle and configured to limit a vertical movement and a lateral movement of the visor.

11. The sun visor assembly of claim 10, wherein the head operably decouples from the mount and the retaining feature operably decouples from the interior ceiling of the vehicle when a vehicle-downward force is applied to the guide rod, and wherein the second portion is configured to decouple from the visor when a lateral force that is opposite the terminal end is applied to the guide rod.

12. The sun visor assembly of claim 11, wherein the guide rod is in an assembled position when the head is operably coupled to the mount, the retaining feature is operably coupled to the interior ceiling of the vehicle, and the second portion is coupled to the visor, and wherein the guide rod is in a disassembled position when the head is decoupled from the mount, the retaining feature is decoupled from the interior ceiling of the vehicle, and the second portion is decoupled from the visor.

13. The sun visor assembly of claim 10, wherein the impact member defines a conical shape with an impact point distal from the terminal end and a rear section that extends away from the terminal end and into the receiver and a rear surface that abuts the terminal end.

14. The sun visor assembly of claim 10, wherein the guide rod first portion and second portion intersect at a corner, and wherein the guide rod first portion, second portion, and the corner generally define an L-shape.

15. The sun visor assembly of claim 10, wherein the impact point is integrally formed from the impact member.

16. The sun visor assembly of claim 10, wherein the impact member is press-fit coupled to the receiver.

17. A method of operating a sun visor assembly for a vehicle, comprising:
positioning a visor on a supporting guide rod;
decoupling a chamfered head of the guide rod from a mount coupled to an interior support of the vehicle;
translating the guide rod out from a channel that is defined within a top section of the visor and extends along a width of the visor; and
forcibly moving the guide rod toward a window of the vehicle such that an impact point that is comprises of a hardened material and a at a terminal end of the guide rod contacts the window.

18. The method of claim 17, further comprising breaking the window of the vehicle with the contact.

19. The method of claim 17, further comprising rotating the visor about a center axis of a second portion of the guide rod from a first position to a second position.

20. The method of claim 17, further comprising decoupling the visor and the guide rod from a retaining feature coupled to the interior support of the vehicle.

* * * * *

UNITED STATES PATENT AND TRADEMARK OFFICE
CERTIFICATE OF CORRECTION

PATENT NO. : 11,780,302 B2
APPLICATION NO. : 17/481527
DATED : October 10, 2023
INVENTOR(S) : Weyrauch et al.

It is certified that error appears in the above-identified patent and that said Letters Patent is hereby corrected as shown below:

In the Claims

Column 9:
Claim 7, Line 43;
"receive" should be --receiver--.

Column 10:
Claim 17, Line 53;
"comprises" should be --comprised--.
Claim 17, Line 54;
"and a at a terminal" should be --and at a terminal--.

Signed and Sealed this
Twelfth Day of December, 2023

*Katherine Kelly Vidal*

Katherine Kelly Vidal
*Director of the United States Patent and Trademark Office*